(12) United States Patent
Jadhav et al.

(10) Patent No.: US 10,891,627 B2
(45) Date of Patent: Jan. 12, 2021

(54) METHODS AND APPARATUS FOR USING ARTIFICIAL INTELLIGENCE ENTITIES TO PROVIDE INFORMATION TO AN END USER

(71) Applicant: salesforce.com, inc., San Francisco, CA (US)

(72) Inventors: Tushar G. Jadhav, Plainsboro, NJ (US); Kamleshkumar Patel, Austin, TX (US)

(73) Assignee: salesforce.com, inc., San Francisco, CA (US)

( * ) Notice: Subject to any disclaimer, the term of this patent is extended or adjusted under 35 U.S.C. 154(b) by 808 days.

(21) Appl. No.: 15/433,108

(22) Filed: Feb. 15, 2017

(65) Prior Publication Data

US 2018/0232741 A1    Aug. 16, 2018

(51) Int. Cl.
| | |
|---|---|
| *G06Q 30/00* | (2012.01) |
| *G06Q 50/00* | (2012.01) |
| *G06F 17/28* | (2006.01) |
| *G06F 15/16* | (2006.01) |
| *H04L 12/58* | (2006.01) |
| *G06N 3/00* | (2006.01) |

(52) U.S. Cl.
CPC ......... *G06Q 30/016* (2013.01); *H04L 51/04* (2013.01); *G06N 3/006* (2013.01)

(58) Field of Classification Search
CPC ....... H04L 51/02; G06Q 30/016; G06N 3/006
USPC ................................................ 706/1–62; 1/1
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Brandon S Cole
(74) *Attorney, Agent, or Firm* — LKGlobal | Lorenz & Kopf, LLP (57) ABSTRACT

A method for using an artificial intelligence (AI) entity to interface with a customer relationship management (CRM) software platform online is provided. The method receives user input changes to the CRM software platform, by the AI entity comprising at least one processor and a memory element, wherein the AI entity is configured to perform chat-bot functionality; alters, by the at least one processor, contents of the CRM software platform associated with the user input changes, in response to the AI entity receiving the user input changes; continuously receives CRM data from the CRM software platform, by the at least one processor; receives, by the at least one processor, a user request for a subset of the CRM data; and in response to the user request, transmits the subset.

20 Claims, 4 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 * | 10/2004 | Jones ............... H04M 3/4938 379/88.01 |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,280,874 B2 * | 10/2012 | Weissman ............ G06F 21/6218 707/716 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0218032 A1 * | 9/2006 | Patrick ............... G06Q 30/016 705/1.1 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |

* cited by examiner

METHODS AND APPARATUS FOR USING ARTIFICIAL INTELLIGENCE ENTITIES TO PROVIDE INFORMATION TO AN END USER

TECHNICAL FIELD

Embodiments of the subject matter described herein relate generally to the use of artificial intelligence associated with online communications. More particularly, embodiments of the subject matter relate to performing functionality at a customer relationship management (CRM) software platform by a chat-bot.

BACKGROUND

Artificial intelligence (AI) may be used to provide information to users via online communications with "chat-bots" or other automated interactive tools. Using chat-bots, automated AI systems conduct text-based chat conversations with users, through which users request and receive information. Chat-bots generally provide information to users for predetermined situations and applications, using locally stored memory. However, functionality of the chat-bot may be limited, and the chat-bot may not have access to all applicable information.

Accordingly, it is desirable to provide additional applicable data to a user when AI embodiments are unable to do so. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for using an artificial intelligence (AI) entity to interface with a customer relationship management (CRM) software platform online. The method receives user input changes to the CRM software platform, by the AI entity comprising at least one processor and a memory element, wherein the AI entity is configured to perform chat-bot functionality; alters, by the at least one processor, contents of the CRM software platform associated with the user input changes, in response to the AI entity receiving the user input changes; continuously receives CRM data from the CRM software platform, by the at least one processor; receives, by the at least one processor, a user request for a subset of the CRM data; and in response to the user request, transmits the subset.

Some embodiments of the present disclosure provide a system using an artificial intelligence (AI) entity to interface with a customer relationship management (CRM) software platform online. The system includes: a system memory element; a communication device configured to transmit and receive text-based data messages from a user interface; and at least one processor communicatively coupled to the system memory element and the communication device, the at least one processor configured to: receive user input changes to the CRM software platform, via the communication device; alter contents of the CRM software platform associated with the user input changes, in response to receiving the user input changes; continuously receive CRM data from the CRM software platform, via the communication device; receive a user request for a subset of the CRM data, via the communication device; and in response to the user request, transmit the subset via the communication device; wherein the text-based data messages comprise the user input changes, the CRM data, the user request, and the subset.

Some embodiments of the present disclosure provide a non-transitory, computer-readable medium containing instructions thereon, which, when executed by a processor, are capable of performing a method. The method establishes a first communication connection for online chat between a user interface and an artificial intelligence (AI) entity comprising at least one processor and a memory element; establishes a second communication connection between the AI entity and a server configured to store, execute, and maintain the CRM software platform; receives, by the AI entity, user input changes to a customer relationship management (CRM) software platform, wherein the AI entity is configured to perform chat-bot functionality via the first communication connection, and wherein the user input changes are received via the first communication connection; alters contents of the CRM software platform associated with the user input changes, in response to the AI entity receiving the user input changes, by the at least one processor and via the second communication connection; continuously receives CRM data from the CRM software platform, by the at least one processor and via the second communication connection; receives a user request for a subset of the CRM data, by the at least one processor and via the first communication connection; and in response to the user request, transmits the subset to the user interface via the first communication connection.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for using artificial intelligence (AI) entities, also known as "chat-bots", to provide information to an end user. More specifically, the subject matter relates to the use of chat-bots to provide automated responses to various end user queries, to provide continuously streaming status updates, and to connect the end user to a live agent communicating through a customer service terminal.

Figure 1:
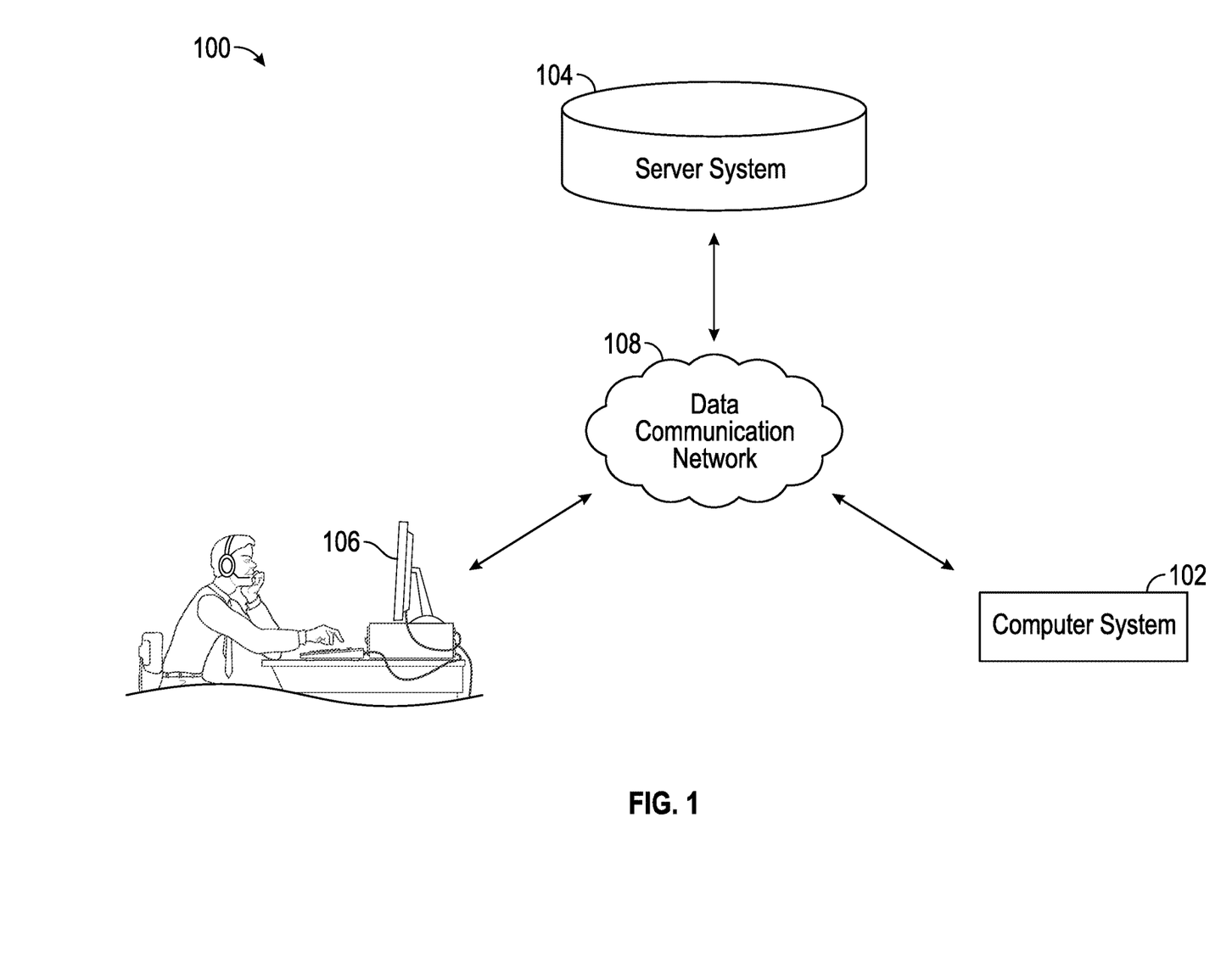
FIG. 1 is a diagram of an artificial intelligence (AI) communication system, in accordance with the disclosed embodiments.

Turning now to the figures, FIG. 1 is a diagram of an artificial intelligence (AI) communication system 100, in accordance with the disclosed embodiments. As shown, the AI communication system 100 includes a computer system 102 with the capability to communicate, via a data communication network 108, with a server system 104 and a human customer service representative at a customer service terminal 106. It should be appreciated that the computer system 102, the server system 104, and the customer service terminal 106, and any corresponding logical elements, individually or in combination, are exemplary means for performing a claimed function. In practice, an embodiment of the AI communication system 100 may include additional or alternative elements and components, as desired for the particular application, without departing from the scope of the present disclosure.

The computer system 102 may be implemented by any computing device that includes at least one processor, some form of memory hardware, a user interface, and communication hardware, such that a user may communicate with the server system 104 and/or the customer service terminal 106. The computer system 102 is capable of communicating with a server system 104 and the customer service terminal 106 via a data communication network 108. The computer system 102 and the server system 104 are generally disparately located. The computer system 102 is configured to transmit text-based communications to an artificial intelligence (AI) entity stored and executed by the server system 104, which may make changes to data stored by the server system 104. In certain embodiments, the computer system 102 may transmit text-based messages to an AI entity associated with the server system 104, and these text-based messages alter and/or add to a customer relationship management (CRM) software platform and database stored by, and connected to, the server system 104.

The computer system 102 is capable of communicating with a server system 104 via a data communication network 108. The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

The server system 104 may include any number of application servers, and each server may be implemented using any suitable computer. In some embodiments, the server system 104 includes one or more dedicated computers. In some embodiments, the server system 104 includes one or more computers carrying out other functionality in addition to server operations. The server system 104 is generally configured to host: (i) an event-driven, input/output (I/O), server-side JavaScript environment which encapsulates an intelligence layer; and (ii) core enterprise computing platform capabilities, which may include, but are not limited to, Representational State Transfer (ReST) application programming interface (API), Streaming API, Lightning Out, Visualforce, Apex, or the like. The server system is configured to store, maintain, and execute one or more software platforms and programs, such as a customer relationship management (CRM) software platform that stores customer data and customer interaction data, business information, sales data, marketing data, customer support data, employee data, vendor and partner relationship data, or the like. The CRM software platform may also include functionality to manage customer data and customer interaction, access business information, automate sales, marketing and customer support and also manage employee, vendor and partner relationships.

The customer service terminal 106, like the computer system 102, may be implemented by any computing device that includes at least one processor, some form of memory hardware, and a user interface, such that a customer service representative may communicate with the computer system 102 by sending and receiving text-based messages from the customer service terminal 106. The computer system 102 and the customer service terminal 106 are generally disparately located, and the exchange of text-based messages generally occurs over the data communication network 108.

During typical operation, the computer system 102 establishes a communication connection, via the data communication network 108, to an AI entity stored, maintained, and executed by the server system 104. A user may conduct a text-based chat session with the AI entity, which may be implemented as a "chat-bot". Through this text-based chat session, the computer system 102 sends requests for data, sends and receives data to complete commercial transactions, and submits changes or additions to data stored at the server system 104.

Figure 2:
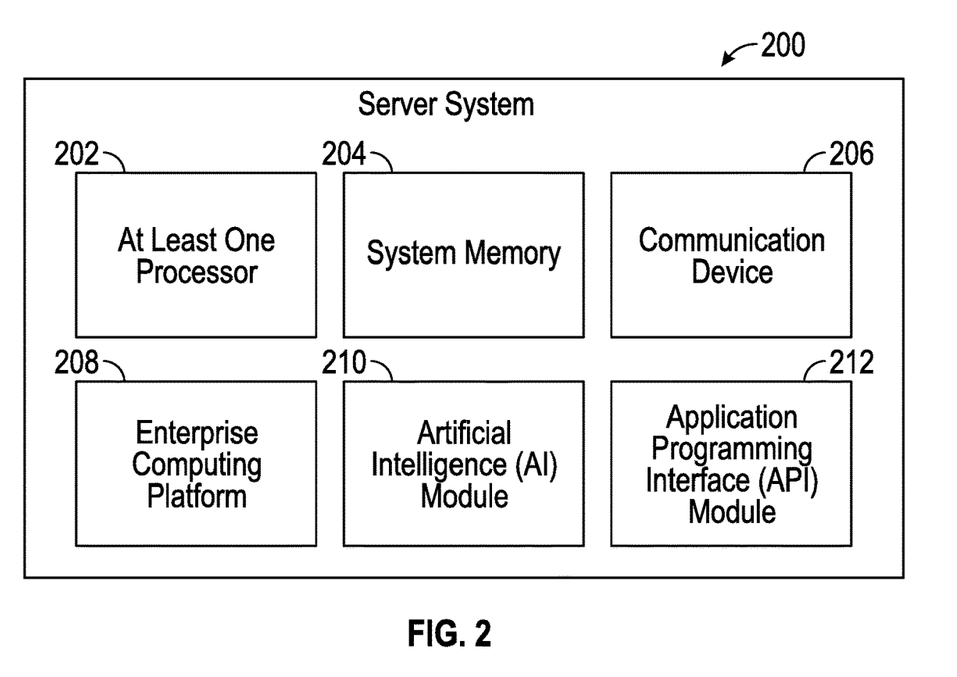
FIG. 2 is a functional block diagram of a server system, in accordance with the disclosed embodiments.

FIG. 2 is a functional block diagram of a server system 200, in accordance with the disclosed embodiments. It should be noted that the server system 200 can be implemented with the server system 104 depicted in FIG. 1. In this regard, the server system 200 shows certain elements and components of the server system 104 in more detail. The server system 200 generally includes, stores, maintains, operates, and/or executes, without limitation: at least one processor 202; system memory 204 hardware; a communication device 206; an enterprise computing platform 208; an artificial intelligence (AI) module 210; and an application programming interface (API) module 212. These elements and features of server system 200 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 2. Moreover, it should be appreciated that embodiments of the server system 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to, and communicates with, the system memory 204. The system memory 204 is configured to store any obtained or generated data associated with storing, maintaining, and executing a communication platform 308 for use to conduct text-based online conversations (e.g., "chat") with live agents and/or chat-bots, and graphical elements associated with the communication platform 308. The system memory 204 may be realized using any number of devices, components, or modules, as appropriate to the embodiment. Moreover, the server system 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the server system 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The communication device 206 is suitably configured to communicate data between the server system 200 and one or more computer systems (e.g., computer system 102 of FIG. 1) and one or more customer service terminals (e.g., customer service terminal 106 of FIG. 1). The communication device 206 may transmit and receive communications over a wireless local area network (WLAN), the Internet, a satellite uplink/downlink, a cellular network, a broadband network, a wide area network, or the like. As described in more detail below, data received by the communication device 206 may include, without limitation: text-based messages from a chat-bot (i.e., AI entity) and/or a customer service terminal, and data associated with customer purchase orders, such as a purchase order number and purchase order status data, and other data compatible with the server system 200. Data provided by the communication device 206 may include, without limitation, customer identifying information, requests for customer purchase order data, and the like.

The enterprise computing platform 208 may be implemented using a customer relationship management (CRM) software application, which is configured to store customer data including ordering data, pricing data, shipping data, or the like. In certain embodiments, the enterprise computing platform 208 may be implemented by a multi-tenant database system, as described in more detail with regard to FIG. 5.

The enterprise computing platform 208 is: (i) an event-driven, input/output (I/O), server-side JavaScript environment which encapsulates an intelligence layer; and (ii) core enterprise computing platform capabilities, which may include, but are not limited to, Representational State Transfer (ReST) application programming interface (API), Streaming API, Lightning Out, Visualforce, Apex, or the like. The CRM software application may store customer data and customer interaction data, business information, sales data, marketing data, customer support data, employee data, vendor and partner relationship data, or the like. The CRM software platform may also include functionality to manage customer data and customer interaction, access business information, automate sales, marketing and customer support and also manage employee, vendor and partner relationships.

The artificial intelligence (AI) module 210 is suitably configured to implement and use one or more AI entities, or in other words, "chat-bots", to interact with a user via a text-based chat feature of any appropriate communication platform. As used herein, chat-bot may be defined as a computer program that simulates human conversation (i.e., "chat") through artificial intelligence. Typically, a chat bot will communicate with a human user, and chat-bots are often used in applications such as ecommerce customer service. The AI module 210 implements one or more chat-bots to interact with any communication platform or chat product or service, such as Facebook Messenger, Slack, Telegram, Alexa, Skype, or any other text messaging platform. In certain embodiments, the AI module 210 provides a chat-bot to interact with a user via a communication platform executed and operated by the user. Such a chat-bot may provide text-based answers to user-entered, text-based queries. To accomplish this, the AI module 210 exchanges data with an application programming interface (API) module 212 that communicates with the enterprise computing platform 208. The AI module 210 includes intelligence to interpret intent of a user and to make appropriate decisions based on past interactions with users. In the event of uncertainty (e.g., a user query with no predefined answer), the AI module 210 redirects the request to a live agent.

The application programming interface (API) module 212 is configured to establish a communication connection between the enterprise computing platform 208 and the AI module 210 for purposes of receiving user requests for data from the AI module 210, obtaining requested data from the enterprise computing platform 208, and establishing one or more communication channels from the AI module 210 to a customer service terminal communicatively coupled to the enterprise computing platform 208, from which a live customer service agent may communicate with a user that has been communicating with a chat-bot provided by the AI module 210.

In practice, the enterprise computing platform 208, the artificial intelligence (AI) module 210, and/or the application programming interface (API) module 212, may be implemented with (or cooperate with) the at least one processor 202 to perform at least some of the functions and operations described in more detail herein. In this regard, the enterprise computing platform 208, the AI module 210, and/or the API module 212 may be realized as suitably written processing logic, application program code, or the like.

Figure 3:
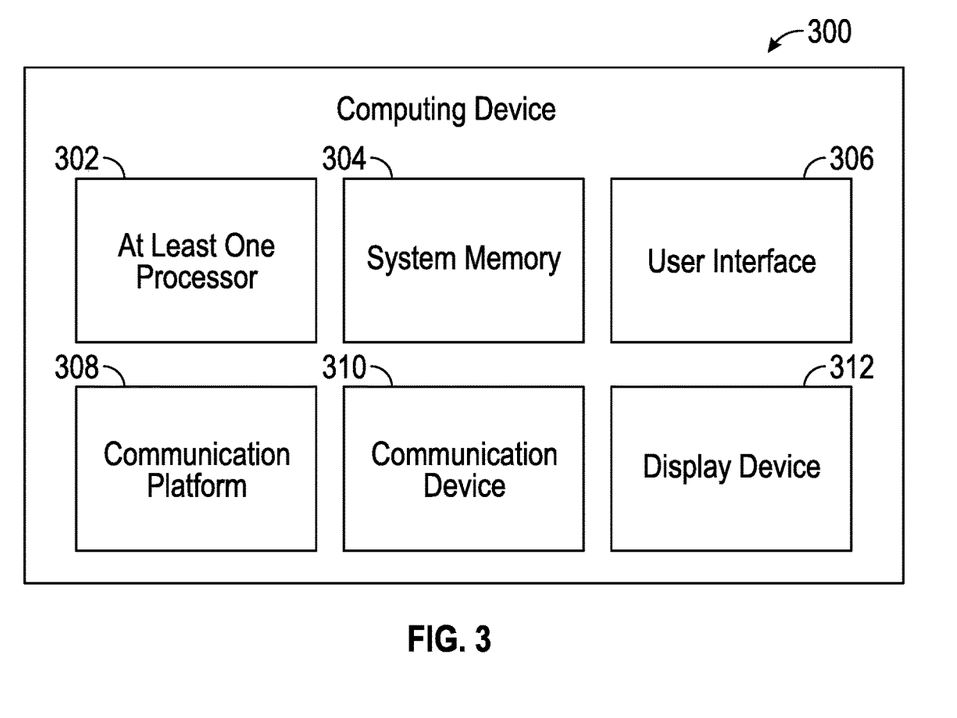
FIG. 3 is a functional block diagram of a computing device, in accordance with the disclosed embodiments.

FIG. 3 is a functional block diagram of a computing device 300, in accordance with the disclosed embodiments. The computing device 300 is configured for use, by a first user, to connect to and communicate with disparately located server systems executing artificial intelligence (AI) entities and/or a disparately located computer system operated by a second user (e.g., a customer service terminal). It should be noted that the computing device 300 can be implemented with the computer system 102 depicted in FIG. 1. In this regard, the computing device 300 shows certain elements and components of the computer system 102 in more detail. The computing device 300 generally includes, without limitation: at least one processor 302; system memory 304 hardware; a user interface 306; a communication platform 308; and a communication device 310. The at least one processor 302, the system memory 304, and the communication device 310 are similar in configuration and function to their counterpart items described above in the context of the server system 200. Accordingly, common features and operations of these elements of the computing device 300 will not be redundantly described here.

The user interface 306 may include or cooperate with various features to allow a user to interact with the computing device 300. Accordingly, the user interface 306 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the computing device 300. For example, the user interface 306 could be manipulated by an operator to conduct a text-based, online conversation or "chat" with an AI entity (i.e., chat-bot) connected via the communication device 310, or to conduct a text-based, online chat with a live agent using a customer service terminal connected via the communication device 310, as described herein.

In certain embodiments, the user interface 306 may include or cooperate with various features to allow a user to interact with the computing device 300 via graphical elements rendered on a display element. Accordingly, the user interface 306 may initiate the creation, maintenance, and presentation of a graphical user interface (GUI). In certain embodiments, the display device 312 implements touch-sensitive technology for purposes of interacting with the GUI. Thus, a user can manipulate the GUI by moving a cursor symbol rendered on the display device 312, or by physically interacting with the display device 312 itself for recognition and interpretation, via the user interface 306.

The communication platform 308 is configured to provide an interface through which a user may conduct a text-based online conversation (i.e., online chat). The communication platform 308 is generally implemented as a software application that is stored, maintained, and executed by the computing device 300. The communication platform 308 may be implemented using any communication platform or chat product or service, such as Facebook Messenger, Slack, Telegram, Alexa, Skype, or any other text messaging platform. The communication platform 308 is suitably configured to establish a text-based communication connection between the computing device 300, and: (i) an artificial intelligence (AI) entity (i.e., chat-bot) maintained and executed by a server system, and/or (ii) a human agent communicating from a customer service terminal.

The display device 312 is configured to display various icons, text, and/or graphical elements associated with the use of the communication platform 308 to communicate with an AI entity or "chat-bot". In an exemplary embodiment, the display device 312 is communicatively coupled to the user interface 306, and the user interface 306 is communicatively coupled to the at least one processor 302. The at least one processor 302, the user interface 306, and the display device 312 are cooperatively configured to display, render, or otherwise convey one or more graphical representations or images associated with the communication platform 308 on the display device 312, as described in greater detail below. In an exemplary embodiment, the display device 312 is realized as an electronic display, as described herein. In some embodiments, the display device 312 is implemented as a display screen of a standalone, personal computing device (e.g., laptop computer, tablet computer). It will be appreciated that although the display device 312 may be implemented using a single display, certain embodiments may use additional displays (i.e., a plurality of displays) to accomplish the functionality of the display device 312 described herein.

Figure 4:
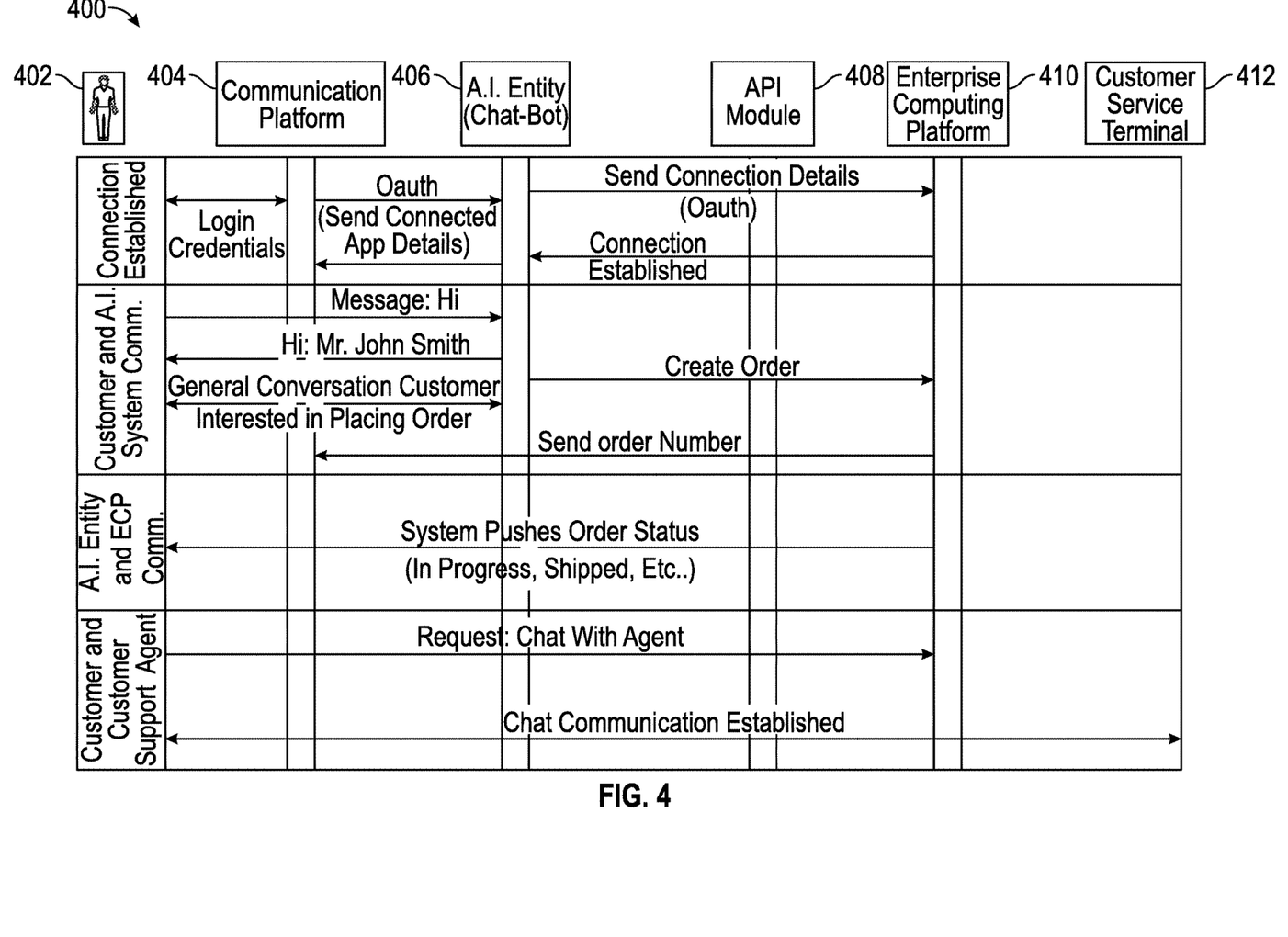
FIG. 4 is a diagram illustrating communications of an AI communication system, in accordance with the disclosed embodiments.

FIG. 4 is a communication diagram 400, which illustrates an exemplary embodiment of a communication flow between elements of an artificial intelligence (AI) communication system. The AI communication system includes a communication platform 404 operated by a user 402 to communicate with an AI entity 406. As described with regard to FIGS. 1-3, the communication platform 404 is generally executed on a computer system operated by the user 402. The various tasks performed, and messages transmitted, in connection with communication diagram 400 may be performed by software, hardware, firmware, or any combination thereof. For illustrative purposes, the following description of communication diagram 400 may refer to elements mentioned above in connection with FIGS. 1-3. In practice, portions of communication diagram 400 may be performed by different elements of the described system, e.g., the communication platform 404, the AI entity 406, the API module 408, or the enterprise computing platform 410. It should be appreciated that communication diagram 400 may include any number of additional or alternative tasks or message transmissions, the messages/communications shown in FIG. 4 need not be performed in the illustrated order, and the message transmissions illustrated in communication diagram 400 may be incorporated into a more comprehensive procedure or process having additional functionality not described in detail herein. Moreover, one or more of the tasks and/or message transmissions shown in FIG. 4 could be omitted from an embodiment of performance of the AI communication system as long as the intended overall functionality remains intact.

The AI entity 406 is configured to conduct a text-based, automated conversation with the user 402 via the communication platform 404. During the text-based, automated conversation, the AI entity 406 operates to (i) receive requests from the user 402, via the communication platform 404; (ii) obtain data from the enterprise computing platform 410 that is relevant to the requests from the user 402, using the application programming interface (API) module 408; and (iii) provide the relevant data to the user 402, via the communication platform 404. In certain embodiments, the AI entity 406 is implemented as a chat-bot (described above with regard to FIGS. 1-2). Additionally, the AI entity 406 operates to establish a chat communication connection from the communication platform 404 to a customer service terminal 412, such that the user 402 can conduct a chat conversation with a customer service agent, instead of an automated chat-bot implemented by the AI entity 406.

In this exemplary embodiment, the communication platform 404 first receives login credentials from the user 402, for purposes of logging the user 402 into the communication platform 404 to interface with the AI entity 406. Here, the user 402 logs into an online chat product (i.e., the communication platform 404) to conduct an online chat with a chat-bot (i.e., the AI entity 406).

After receiving the user login credentials, the communication platform 404 transmits connected application details to the AI entity 406 for purposes of establishing a communication connection with the AI entity 406. In response, the AI entity 406 establishes the connection with the communication platform 404 and transmits connection details to the API module 408 and the enterprise computing platform 410. Once connection details are received, the enterprise computing platform 410 establishes a connection to the AI entity 406, such that the AI entity 406 can retrieve data from the enterprise computing platform 410 and perform operations using the enterprise computing platform 410.

After the enterprise computing platform 410 has established the connection to the AI entity 406, the user 402 can provide the communication platform 404 with an initial greeting (e.g., "Hi") to initiate communication with the AI entity 406. The AI entity 406 responds to the initial greeting by providing an acknowledgment greeting, and participating in general conversation with the user 402 via the communication platform 404, by providing predetermined responses to initial inquiries.

In some embodiments, the AI entity 406 receives a communication from a user indicating that the user would like to place an order to purchase a product or service. In this scenario, the AI entity 406 receives a set of text data and interprets the set of text data to determine an appropriate response. Here, the AI entity 406 performs a lookup in a memory storage location, and compares the received text-based message to a plurality of stored text-based messages to locate a match. When the match is located, then the AI entity 406 identifies a corresponding action that is also stored in the memory storage location, wherein the action corresponds to one of the plurality of stored text-based messages (i.e., the "match") and indicates an appropriate procedure for the AI entity 406 to execute and complete and/or a text-based message for the AI entity 406 to transmit via the communication platform 404.

Here, when the AI entity 406 determines, based on user input to the communication platform 404, that the user 402 wishes to place an order to purchase a product or service, then the AI entity 406 performs appropriate actions at the enterprise computing platform 410 to create an order in the enterprise computing platform 410. As described previously, the enterprise computing platform may be implemented as a customer relationship management (CRM) software application and database, which may be used to create and store customer and ecommerce data.

The customer order is created by the AI entity 406 using the API module 408. The API module 408 provides a mechanism through which the AI entity 406 performs operations at the enterprise computing platform 410. The API module 408 has direct access to information stored in any database maintained by the enterprise computing platform 410, and to create or query orders stored and maintained by the enterprise computing platform 410. The API module 408 also has a "streaming" capability that pushes any updates that are made to the order records in the database.

Once the customer order is created, by the AI entity 406 at the enterprise computing platform 410, the enterprise computing platform 410 transmits an order number to the communication platform 404, for viewing by the user 402. As shown in the communication diagram 400, the enterprise computing platform 410 "pushes" or in other words, transmits, order status data to the communication platform 404 for presentation to the user 402. In some embodiments, the enterprise computing platform 410 continuously streams the order status data to the communication platform 404, for continuous viewing by the user 402. In some embodiments, the AI entity 406 transmits a request for an order status, and the enterprise computing platform 410 provides the order status in response to the request.

The AI entity 406 is also configured to receive requests from the user 402, via the communication platform 404, to bypass the text-based communication connection to the AI entity 406 (i.e., the chat-bot connection) to establish a communication connection to a customer service terminal 412 for purposes of conducting a text-based chat session with a live agent, or in other words, to communicate with a human being rather than a chat-bot. In this scenario, the user 402 enters a request to chat with a live agent, via the communication platform 404. The request is transmitted by the AI entity 406 to the enterprise computing platform 410, and the API module 408 establishes a communication connection between the communication platform 404 and the customer service terminal 412. Once the communication connection is established by the API module 408, the user 402 is able to chat with the live agent at the customer service terminal 412 using the communication connection. Once the communication channel is established, the AI entity 406 disconnects from the connection to the user 402, and the live agent at the customer service terminal 412 is responsible for servicing the customer.

Figure 5:
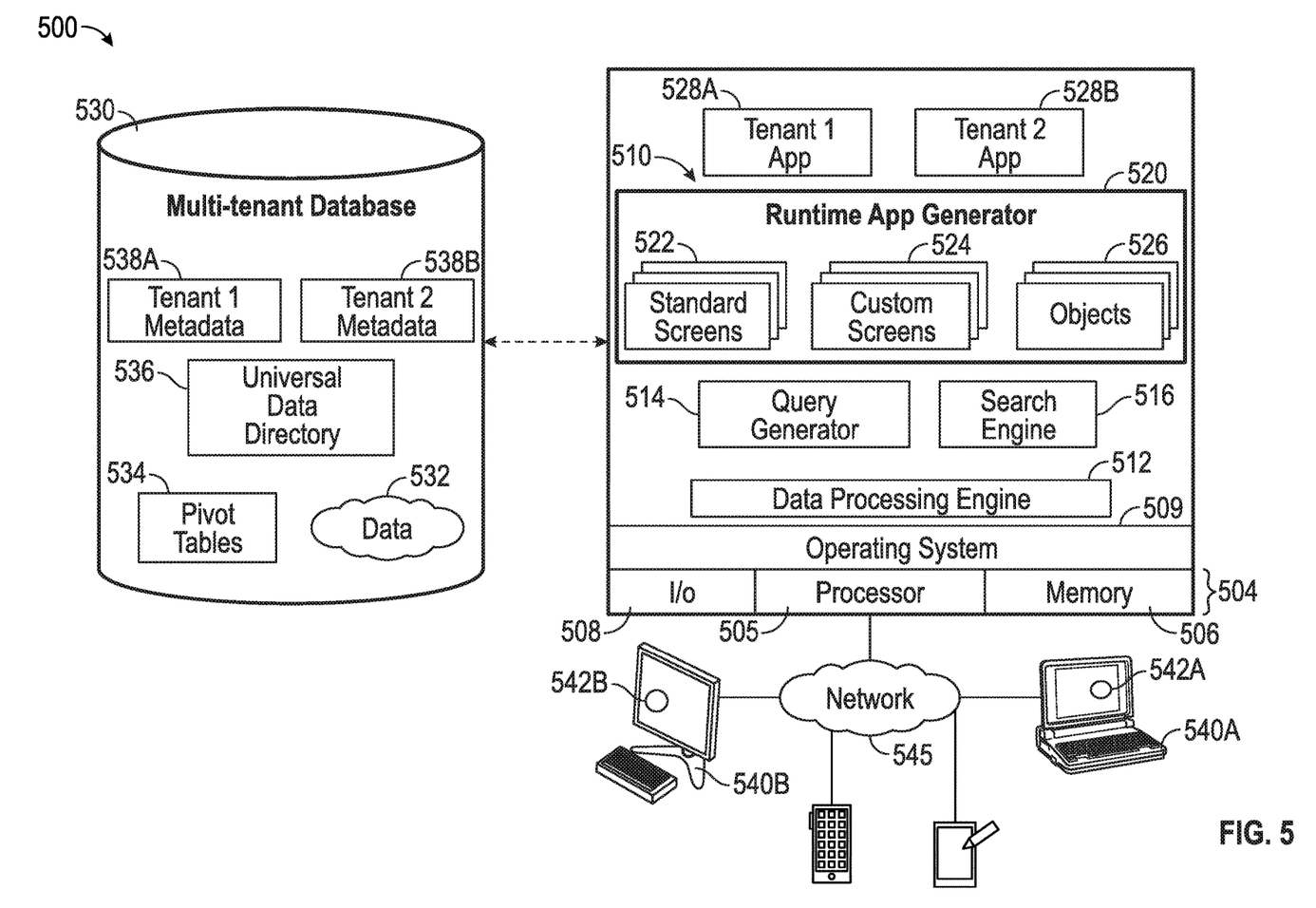
FIG. 5 is a conceptual block diagram of a multi-tenant system in accordance with one embodiment.

FIG. 5 is a conceptual block diagram of a multi-tenant system 500 in accordance with the disclosed embodiments. The multi-tenant system 500 may be used to in conjunction with the CRM software applications described previously. Platform as a Service (PaaS) is the foundation of the multi-tenant architecture. At the heart, this PaaS is a relational database management system. All of the core mechanisms in a relational database management system (RDBMS) (e.g., a system catalog, caching mechanisms, query optimizer, and application development features) are built to support multi-tenant applications and to be run directly on top of a specifically tuned host operating system and raw hardware. The runtime engine has the intelligence to access the metadata and transactional data and perform the application functionality that can scale.

The multi-tenant system 500 of FIG. 5 includes a server 502 that dynamically creates and supports virtual applications 528 based upon data 532 from a common database 530 that is shared between multiple tenants, alternatively referred to herein as a multi-tenant database. Data and services generated by the virtual applications 528 are provided via a network 545 to any number of client devices 540, as desired. Each virtual application 528 is suitably generated at run-time (or on-demand) using a common application platform 510 that securely provides access to the data 532 in the database 530 for each of the various tenants subscribing to the multi-tenant system 500. In accordance with one non-limiting example, the multi-tenant system 500 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 530. In this regard, each tenant includes one or more users associated with, assigned to, or otherwise belonging to that respective tenant. To put it another way, each respective user within the multi-tenant system 500 is associated with, assigned to, or otherwise belongs to a particular tenant of the plurality of tenants supported by the multi-tenant system 500. Tenants may represent customers, customer departments, business or legal organizations, and/or any other entities that maintain data for particular sets of users within the multi-tenant system 500 (i.e., in the multi-tenant database 530). For example, the application server 502 may be associated with one or more tenants supported by the multi-tenant system 500. Although multiple tenants may share access to the server 502 and the database 530, the particular data and services provided from the server 502 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 532 belonging to or otherwise associated with other tenants.

The multi-tenant database 530 is any sort of repository or other data storage system capable of storing and managing the data 532 associated with any number of tenants. The database 530 may be implemented using any type of conventional database server hardware. In various embodiments, the database 530 shares processing hardware 504 with the server 502. In other embodiments, the database 530 is implemented using separate physical and/or virtual database server hardware that communicates with the server 502 to perform the various functions described herein. In an exemplary embodiment, the database 530 includes a database management system or other equivalent software capable of determining an optimal query plan for retrieving and providing a particular subset of the data 532 to an instance of virtual application 528 in response to a query initiated or otherwise provided by a virtual application 528. The multi-tenant database 530 may alternatively be referred to herein as an on-demand database, in that the multi-tenant database 530 provides (or is available to provide) data at run-time to on-demand virtual applications 528 generated by the application platform 510.

In practice, the data 532 may be organized and formatted in any manner to support the application platform 510. In various embodiments, the data 532 is suitably organized into a relatively small number of large data tables to maintain a semi-amorphous "heap"-type format. The data 532 can then be organized as needed for a particular virtual application 528. In various embodiments, conventional data relationships are established using any number of pivot tables 534 that establish indexing, uniqueness, relationships between entities, and/or other aspects of conventional database organization as desired. Further data manipulation and report formatting is generally performed at run-time using a variety of metadata constructs. Metadata within a universal data directory (UDD) 536, for example, can be used to describe any number of forms, reports, workflows, user access privileges, business logic and other constructs that are common to multiple tenants. Tenant-specific formatting, functions and other constructs may be maintained as tenant-specific metadata 538 for each tenant, as desired. Rather than forcing the data 532 into an inflexible global structure that is common to all tenants and applications, the database 530 is organized to be relatively amorphous, with the pivot tables 534 and the metadata 538 providing additional structure on an as-needed basis. To that end, the application platform 510 suitably uses the pivot tables 534 and/or the metadata 538 to generate "virtual" components of the virtual applications 528 to logically obtain, process, and present the relatively amorphous data 532 from the database 530.

The server 502 is implemented using one or more actual and/or virtual computing systems that collectively provide the dynamic application platform 510 for generating the virtual applications 528. For example, the server 502 may be implemented using a cluster of actual and/or virtual servers operating in conjunction with each other, typically in association with conventional network communications, cluster management, load balancing and other features as appropriate. The server 502 operates with any sort of conventional processing hardware 504, such as a processor 505, memory 506, input/output features 508 and the like. The input/output features 508 generally represent the interface(s) to networks (e.g., to the network 545, or any other local area, wide area or other network), mass storage, display devices, data entry devices and/or the like. The processor 505 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 506 represents any non-transitory short or long term storage or other computer-readable media capable of storing programming instructions for execution on the processor 505, including any sort of random access memory (RAM), read only memory (ROM), flash memory, magnetic or optical mass storage, and/or the like. The computer-executable programming instructions, when read and executed by the server 502 and/or processor 505, cause the server 502 and/or processor 505 to create, generate, or otherwise facilitate the application platform 510 and/or virtual applications 528 and perform one or more additional tasks, operations, functions, and/or processes described herein. It should be noted that the memory 506 represents one suitable implementation of such computer-readable media, and alternatively or additionally, the server 502 could receive and cooperate with external computer-readable media that is realized as a portable or mobile component or application platform, e.g., a portable hard drive, a USB flash drive, an optical disc, or the like.

The application platform 510 is any sort of software application or other data processing engine that generates the virtual applications 528 that provide data and/or services to the client devices 540. In a typical embodiment, the application platform 510 gains access to processing resources, communications interfaces and other features of the processing hardware 504 using any sort of conventional or proprietary operating system 509. The virtual applications 528 are typically generated at run-time in response to input received from the client devices 540. For the illustrated embodiment, the application platform 510 includes a bulk data processing engine 512, a query generator 514, a search engine 516 that provides text indexing and other search functionality, and a runtime application generator 520. Each of these features may be implemented as a separate process or other module, and many equivalent embodiments could include different and/or additional features, components or other modules as desired.

The runtime application generator 520 dynamically builds and executes the virtual applications 528 in response to specific requests received from the client devices 540. The virtual applications 528 are typically constructed in accordance with the tenant-specific metadata 538, which describes the particular tables, reports, interfaces and/or other features of the particular application 528. In various embodiments, each virtual application 528 generates dynamic web content that can be served to a browser or other client program 542 associated with its client device 540, as appropriate.

The runtime application generator 520 suitably interacts with the query generator 514 to efficiently obtain multi-tenant data 532 from the database 530 as needed in response to input queries initiated or otherwise provided by users of the client devices 540. In a typical embodiment, the query generator 514 considers the identity of the user requesting a particular function (along with the user's associated tenant), and then builds and executes queries to the database 530 using system-wide metadata 536, tenant specific metadata 538, pivot tables 534, and/or any other available resources. The query generator 514 in this example therefore maintains security of the common database 530 by ensuring that queries are consistent with access privileges granted to the user and/or tenant that initiated the request. In this manner, the query generator 514 suitably obtains requested subsets of data 532 accessible to a user and/or tenant from the database 530 as needed to populate the tables, reports or other features of the particular virtual application 528 for that user and/or tenant.

Still referring to FIG. 5, the data processing engine 512 performs bulk processing operations on the data 532 such as uploads or downloads, updates, online transaction processing, and/or the like. In many embodiments, less urgent bulk processing of the data 532 can be scheduled to occur as processing resources become available, thereby giving priority to more urgent data processing by the query generator 514, the search engine 516, the virtual applications 528, etc.

In exemplary embodiments, the application platform 510 is utilized to create and/or generate data-driven virtual applications 528 for the tenants that they support. Such virtual applications 528 may make use of interface features such as custom (or tenant-specific) screens 524, standard (or universal) screens 522 or the like. Any number of custom and/or standard objects 526 may also be available for integration into tenant-developed virtual applications 528. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 526 such as "account" objects, "opportunity" objects, "contact" objects, or the like. The data 532 associated with each virtual application 528 is provided to the database 530, as appropriate, and stored until it is requested or is otherwise needed, along with the metadata 538 that describes the particular features (e.g., reports, tables, functions, objects, fields, formulas, code, etc.) of that particular virtual application 528. For example, a virtual application 528 may include a number of objects 526 accessible to a tenant, wherein for each object 526 accessible to the tenant, information pertaining to its object type along with values for various fields associated with that respective object type are maintained as metadata 538 in the database 530. In this regard, the object type defines the structure (e.g., the formatting, functions and other constructs) of each respective object 526 and the various fields associated therewith.

Still referring to FIG. 5, the data and services provided by the server 502 can be retrieved using any sort of personal computer, mobile telephone, tablet or other network-enabled client device 540 on the network 545. In an exemplary embodiment, the client device 540 includes a display device, such as a monitor, screen, or another conventional electronic display capable of graphically presenting data and/or information retrieved from the multi-tenant database 530. Typically, the user operates a conventional browser application or other client program 542 executed by the client device 540 to contact the server 502 via the network 545 using a networking protocol, such as the hypertext transport protocol (HTTP) or the like. The user typically authenticates his or her identity to the server 502 to obtain a session identifier ("SessionID") that identifies the user in subsequent communications with the server 502. When the identified user requests access to a virtual application 528, the runtime application generator 520 suitably creates the application at run time based upon the metadata 538, as appropriate. As noted above, the virtual application 528 may contain Java, ActiveX, or other content that can be presented using conventional client software running on the client device 540; other embodiments may simply provide dynamic web or other content that can be presented and viewed by the user, as desired.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIGS. 1-3 each depict one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for using an artificial intelligence (AI) entity to interface with a customer relationship management (CRM) software platform online, the AI entity comprising at least one processor and a memory element, the method comprising:
   establishing, by the AI entity, a first communication connection with a communication platform over a network using details received from the communication platform;
   in response to establishing the first communication connection, transmitting, by the AI entity, connection details to an enterprise computing platform providing the CRM software platform to establish a second communication connection with the enterprise computing platform over the network;
   receiving text data corresponding to a user input change to the CRM software platform, by the AI entity via the first communication connection with the communication platform;
   performing, by the AI entity, chat-bot functionality to interpret intent of a user by matching the text data to one of a plurality of stored text-based messages corresponding to an action;
   performing, by the AI entity, the action at the CRM software platform to alter contents of the CRM software platform associated with the user input change via the second communication connection with the enterprise computing platform, in response to the AI entity receiving the text data;
   receiving CRM data from the CRM software platform via the second communication connection with the enterprise computing platform, by the AI entity; and
   transmitting, by the AI entity, the CRM data via the first communication connection with the communication platform.

2. The method of claim 1, further comprising:
   receiving, by the at least one processor, a user input request to initiate online chat communication; and
   in response to the user input request, establishing the first communication connection for online chat between a user interface and the AI entity;
   wherein a user request for a subset of the CRM data is received by the at least one processor via the first communication connection; and
   wherein the subset is transmitted by the at least one processor via the first communication connection.

3. The method of claim 2, further comprising:
   receiving a user input purchase order, via the first communication connection, by the at least one processor; and in response to receiving the user input purchase order, creating a new order in the CRM software platform, via the second communication connection;
wherein the user input change comprises the user input purchase order.

4. The method of claim 2, further comprising:
continuously receiving order status data from the CRM software platform, via the second communication connection, wherein the CRM data comprises the order status data;
wherein the subset is transmitted by the at least one processor via the first communication connection.

5. The method of claim 2, further comprising:
receiving a user input request, via the first communication connection, to conduct an online chat with a customer service representative (CSR);
in response to the user input request, establishing a third communication connection between the user interface and a communication device associated with the CSR.

6. The method of claim 5, wherein the second communication connection uses a first application programming interface (API) to communicate with the CRM software platform; and
wherein the third communication connection uses a second API to communicate with the communication device associated with the CSR.

7. The method of claim 1, the details comprising connected application details transmitted to the AI entity by the communication platform for purposes of establishing the first communication connection after receiving user login credentials for purposes of logging into the communication platform to interface with the AI entity, wherein:
transmitting the connection details comprises the AI entity transmitting the connected application details to the enterprise computing platform; and
the enterprise computing platform establishes the second communication connection to the AI entity once connected application details are received such that the AI entity can retrieve data from the enterprise computing platform and perform operations using the enterprise computing platform.

8. The method of claim 1, wherein transmitting the connection details comprises the AI entity transmitting the connected application details to an application programming interface (API) that communicates with the enterprise computing module and establishes the second communication connection between the enterprise computing module and the AI entity.

9. The method of claim 8, the API module having streaming capability, wherein receiving the CRM data comprises the API module pushing an update made to a record in a database maintained by the enterprise computing platform.

10. The method of claim 1, further comprising transmitting, by the AI entity, a request to chat with a live agent to an API module to establish a third communication connection between the communication platform and a customer service terminal to bypass the first communication connection, wherein the AI entity disconnects from the first communication connection once the third communication connection is established.

11. A system using an artificial intelligence (AI) entity to interface with a customer relationship management (CRM) software platform online, the system comprising:
a system memory element;
a communication device configured to transmit and receive text-based data messages from a user interface;
at least one processor communicatively coupled to the system memory element and the communication device, the at least one processor configured to:
establish a first communication connection between the AI entity and a communication platform over a network using details received from the communication platform;
transmit connection details to an enterprise computing platform providing the CRM software platform to establish a second communication connection with the enterprise computing platform over the network in response to establishing the first communication connection;
receive text data corresponding to a user input change to the CRM software platform, via the communication device and the first communication connection;
perform chat-bot functionality to interpret intent of a user by matching the text data to one of a plurality of stored text-based messages corresponding to an action;
perform the action at the CRM software platform to alter contents of the CRM software platform associated with the user input change via the second communication connection, in response to the AI entity receiving the text data;
receive CRM data from the CRM software platform, via the communication device and the second communication connection; and
transmit the CRM data via the communication device and the second communication connection.

12. The system of claim 11, wherein the at least one processor is further configured to:
receive a user input request to initiate online chat communication; and
in response to the user input request, establish, via the communication device, the first communication connection for online chat between a user interface and the AI entity;
receive a user request for a subset of the CRM data via the first communication connection; and
transmit the subset via the first communication connection.

13. The system of claim 12, wherein the at least one processor is further configured to:
receive a user input purchase order, via the first communication connection; and
in response to receiving the user input purchase order, creating a new order in the CRM software platform, via the second communication connection;
wherein the user input change comprises the user input purchase order.

14. The system of claim 12, wherein the at least one processor is further configured to:
continuously receive order status data from the CRM software platform, via the second communication connection, wherein the CRM data comprises the order status data; and
transmitting the subset via the first communication connection.

15. The system of claim 12, wherein the at least one processor is further configured to:
receive a user input request, via the first communication connection, to conduct an online chat with a customer service representative (CSR);

in response to the user input request, establish a third communication connection between the user interface and a second communication device associated with the CSR.

16. The system of claim 15, wherein the second communication connection uses a first application programming interface (API) to communicate with the CRM software platform; and wherein the third communication connection uses a second API to communicate with the communication device associated with the CSR.

17. The method of claim 12, wherein the user interface comprises a graphical user interface (GUI) associated with a communication software platform;

wherein the user interface is configured to receive text-based user input requests comprising the user input change; and wherein the user interface is configured to present text-based data comprising the subset.

18. A non-transitory, computer-readable medium containing instructions thereon, which, when executed by a processor, are capable of performing a method comprising:

establishing a first communication connection with a communication platform over a network using details received from the communication platform for online chat between a user interface and an artificial intelligence (AI) entity comprising at least one processor and a memory element;

establishing a second communication connection over the network between the AI entity and a server of an enterprise computing platform configured to store, execute, and maintain a customer relationship management (CRM) software platform by transmitting connection details to the enterprise computing platform providing the CRM software platform in response to establishing the first communication connection;

receiving, by the AI entity, text data corresponding to a user input change to the CRM software platform, wherein the AI entity is configured to perform chat-bot functionality to interpret intent of a user by matching the text data to one of a plurality of stored text-based messages corresponding to an action, and wherein the text data is received via the first communication connection;

performing the action at the CRM software platform to alter contents of the CRM software platform associated with the user input change, in response to the AI entity receiving the text data, by the at least one processor and via the second communication connection;

continuously receiving CRM data from the CRM software platform, by the at least one processor and via the second communication connection;

receiving a user request for a subset of the CRM data, by the at least one processor and via the first communication connection; and in response to the user request, transmitting the subset to the user interface via the first communication connection.

19. The non-transitory, computer-readable medium of claim 18, wherein the method further comprises:

receiving, by the at least one processor, a user input request to initiate online chat communication; and in response to the user input request, establishing the first communication connection for online chat between a user interface and the AI entity.

20. The non-transitory, computer-readable medium of claim 18, wherein the method further comprises:

receiving a user input request, via the first communication connection, to conduct an online chat with a customer service representative (CSR);

in response to the user input request, establishing a third communication connection between the user interface and a communication device associated with the CSR.

\* \* \* \* \*